United States Patent [19]

Zilch et al.

[11] 3,958,635
[45] May 25, 1976

[54] METHOD OF INHIBITING SCALE FOR HIGH TEMPERATURE STEAM WELLS

[75] Inventors: Horst E. Zilch, Yorba Linda; Paul W. Fischer, Whittier, both of Calif.

[73] Assignee: Union Oil Company of California, Brea, Calif.

[22] Filed: Sept. 26, 1975

[21] Appl. No.: 617,241

[52] U.S. Cl. .................... 166/244 C; 166/279; 166/310; 21/2.5 A; 252/180; 210/58
[51] Int. Cl.² ................ C02B 5/06; C23F 14/02; E21B 43/00
[58] Field of Search ............... 166/279, 310, 244 C, 166/302, 303; 210/58, 21; 21/2.5 A, 2.7 A; 252/175, 180, 8.55 B, 181; 165/45

[56] References Cited
UNITED STATES PATENTS

| 3,336,221 | 8/1967 | Ralston | 210/58 |
|---|---|---|---|
| 3,467,192 | 9/1969 | Nolan et al. | 166/279 |
| 3,613,788 | 10/1971 | Kautsky | 166/279 |
| 3,663,448 | 5/1972 | Ralston | 21/2.7 A X |
| 3,699,048 | 10/1972 | Krueger et al. | 21/2.7 A X |
| 3,743,603 | 7/1973 | Redmore | 166/312 X |
| 3,782,468 | 1/1974 | Kuwada | 166/279 X |
| 3,809,654 | 5/1974 | Mitchell | 210/58 X |
| 3,867,286 | 2/1975 | Quinlan | 210/58 |

*Primary Examiner*—Stephen J. Novosad
*Attorney, Agent, or Firm*—Richard C. Hartman; Dean Sandford; Gerald L. Floyd

[57] ABSTRACT

A method of inhibiting the formation of scale from aqueous solutions containing scale-forming ions at temperatures of 400° F. and above during production and utilization of such aqueous solutions comprising adding to the solutions certain substituted iminodi(methylene phosphonic acid) compounds or a water-soluble salt thereof.

9 Claims, No Drawings

METHOD OF INHIBITING SCALE FOR HIGH TEMPERATURE STEAM WELLS

BACKGROUND OF THE INVENTION

1. Field of the Invention

This invention relates to a method for preventing the deposition of scale in subterranean formations or in well fluid-gathering metal equipment exposed to high temperature aqueous media. More particularly the invention relates to such a method for preventing the deposition of scale onto formation rock or metal surfaces from geothermal fluids containing calcium and other scale-forming ions during production of the geothermal fluids from a subterranean formation via a well and the subsequent utilization of the produced fluid.

2. Description of the Prior Art

One source of recoverable natural energy is geothermal energy stored in hot subterranean formations. One way of utilizing this geothermal energy involves drilling one or more wells into a subterranean formation which may contain either a geothermal fluid or hot dry rocks. If it contains a geothermal fluid, the fluid may be produced via a well. If it contains only hot dry rocks, a relatively low temperature heat exchange fluid is passed through the formation and recovered via a well after it has been heated by the rocks. In either instance, the process involves, in part, the production of geothermal fluids from the formation to the surface via a well and subsequent handling of the fluid to utilize the geothermal energy. Such utilization may involve electric power generation by using the geothermal energy to drive a turbine, passing the fluid through a helical rotary screw expander power system, use in a binary power cycle with a working fluid such as isobutane in a regenerative heat exchanger, or direct utilization for its heat, water or minerals content, for space heating or process heating.

Within the formation, geothermal fluids are at high temperatures and pressures. Under such conditions, geothermal liquids characteristically contain considerable amounts of various dissolved salts. The production and subsequent utilization of these fluids involve passing them through the formation to a well and then through metal conduits and other fluid handling equipment. During this time, the fluid cools and the pressure is reduced. When this change in condition occurs, the dissolved salts tend to precipitate, adhere to the solid rock or metal surfaces with which they come in contact, and build up in thickness so as to eventually cause plugging of the formation and/or the fluid handling equipment and/or a reduction in the heat transfer properties of the system.

Under other less severe scaling conditions, such as with aqueous solutions, for example brines, flowing through fluid handling equipment at temperatures up to about 200°F., it has been proposed to add various materials to retard scale formation. Among the scale inhibitors suggested have been a wide variety of phosphonic acid derivatives. For example, U.S. Pat. No. 3,336,221 issued Aug. 15, 1967 to Paul H. Ralston describes a method for inhibiting the formation of scale from a system of water or brine containing alkaline earth metal cations and various anions by adding to the system a methylene phosphonic acid or alkali metal or ammonium salt thereof bonded to a nitrogen atom, for example, N,N,N',N'-tetrakis(methylene phosphonic acid) ethylene diamine or a salt thereof. U.S. Pat. No. 3,867,286 issued Feb. 18, 1975 to Patrick M. Quinlan shows polyquaternary ammonium methylene phosphonates as scale inhibitors for water. Other references teach preventing scale formation from commercial waters by adding thereto a mixture of one or more phosphonic acid derivatives and another compound. British Pat. No. 1,361,857 published July 31, 1974 discloses an acrylic or methacrylic polymer as the other compound in the inhibitor mixture. British Pat. No. 1,330.596 published Sep. 19, 1973 utilizes 1,2,3,4,5-penta-carboxylic acid in the inhibitor mixture. Other references teaching the use of various phosphonic acid derivatives as corrosion inhibitors in aqueous systems are: U.S. Pat. No. 3,868,216 issued Feb. 25, 1975 to William Robert Hollingshad, U.S. Pat. No. 3,880,584 issued Apr. 29, 1975 to Derek Redmore, British Pat. No. 1,386,746 published Mar. 12, 1975 and British Pat. No. 1,386,718 published Mar. 12, 1975.

It was found that the scaling problems encountered in handling geothermal liquids are more severe and more difficult to control than in handling water or brine at lower temperatures. Most inhibitors which are effective in controlling scale formation from water and brine are not effective in the higher temperature geothermal liquids.

Accordingly, a principal object of this invention is to provide a method for inhibiting the formation of scale from geothermal fluids during their production from subterranean formations and subsequent handling.

Another object of the invention is to provide such a method for inhibiting the formation of a calcium-containing scale onto the metal surfaces of geothermal fluid production and fluid handling equipment.

A further object of the invention is to provide such a method for inhibiting the formation of scale from liquid-containing geothermal fluids having temperatures above about 400°F.

It is a still further object of the invention to provide such a method for inhibiting the deposition of scale from high temperature wet steam.

Other objects, advantages and features will become apparent from the following description and appended claims.

SUMMARY OF THE INVENTION

A method of inhibiting the formation of scale from geothermal fluids having a temperature of 400°F. and above and containing scale-forming ions in solution or suspension onto the subterranean formation rock or the metal surfaces of equipment used to produce and handle such geothermal fluids comprising adding to the geothermal fluid prior to or during its production and/or handling a water-soluble substituted iminodi(-methylene phosphonic acid) compound having a carbon-to-phosphorus bond or a water-soluble salt thereof having the formula:

$$R_1-N\begin{matrix}\diagup CH_2PO_3M_2 \\ \diagdown CH_2PO_3M_2\end{matrix}$$

wherein $R_1$ is i. $-CH_2PO_3M_2$ ii. 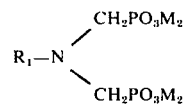

iii. 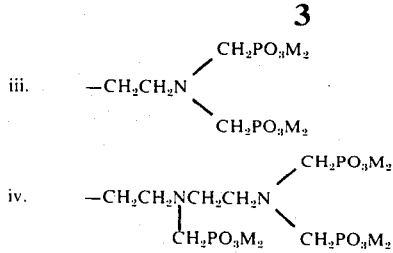

or iv. —CH₂CH₂NCH₂CH₂N(CH₂PO₃M₂)(CH₂PO₃M₂) with CH₂PO₃M₂ branch and M is hydrogen, an alkali metal or an ammonium cation.

DESCRIPTION OF THE PREFERRED EMBODIMENTS

During production of a hot pressurized aqueous fluid containing liquid water having dissolved therein scale-forming ions from a subterranean formation, scale can form at any of a number of locations, such as in the interstices of the formation rock itself as the fluid moves towards a well, in the production conduit of the well or in the fluid-handling equipment at the surface. To retard scale formation, a scale inhibitor must be mixed with the aqueous fluid before scale formation occurs. Thus, in some instances, it may be necessary to inject the inhibitor into the formation via the production well or via an offset well.

If a production well is utilized, production is periodically suspended and the well converted to an injection well until a quantity of inhibitor has been injected out into the formation after which time the well is again placed on production. If an offset well is utilized for injection of the inhibitor, production at the production well may be either continued or suspended during the injection period. In other instances it is sufficient to inject inhibitor into the bottom of the well, i.e., below the bottom end of the production tubing, where it mixes with formation fluid before production up the tubing. In still other instances, the inhibitor can be blended into a produced fluid at the surface before such fluid passes through utilization equipment.

The scale-forming ions most commonly found in geothermal fluids are the alkaline earth metal cations, such as calcium, magnesium and barium and various anions such as carbonate, bicarbonate, sulfate, phosphate, oxalate and silicate. When combinations of these anions and cations are present in concentrations which exceed the solubility of their reaction product, precipitation of solids which build up to form scale will occur.

Suitable methods of preparing water-soluble substituted iminodi(methylene phosphonic acid) compounds and their salts are well known in the art. One method of preparation involves alkylation of amines with chloroacetic acid to yield imino acetic acids and following substitution of carboxylic acid groups for phosphonic acid groups by treating with phosphorous acid.

Particularly effective scale inhibitors are:
nitrilo tri(methylene phosphonic acid)

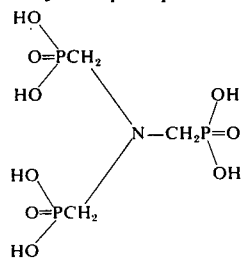

N-benzyl-imino bis(methylene phosphonic acid)

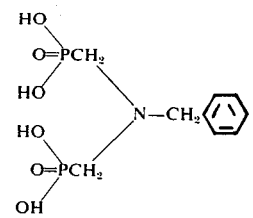

N,N,N',N'-tetrakis(methylene phosphonic acid) ethylene diamine

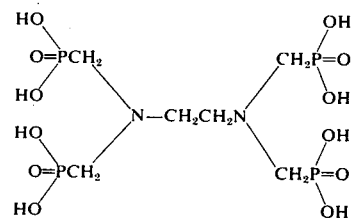

N,N,N',N'',N''-pentakis(methylene phosphonic acid) diethylene triamine

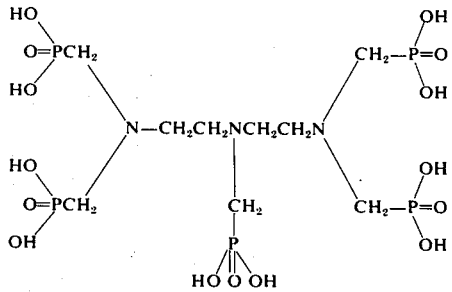

and alkali metal or ammonium salts thereof. While the acid form of the above compounds can be employed, it is preferred to at least partially neutralize them by the addition of ammonia or aqueous solutions of alkali metal or ammonium hydroxide. It is recommended to adjust the pH of these compounds to a value of at least about 5.3.

The inhibitor can be added in concentrated form to the aqueous media containing the scale-forming ions or it can be utilized in the form of an aqueous solution. Where concentrations of inhibitor required are small, dilution of 1 barrel of inhibitor with 50 or more barrels of fresh water forms an inhibitor containing solution which may be added readily to scale-forming compositions.

The concentration of inhibitor required depends to a large extent on the concentration of scale-forming ions in the aqueous solution to be treated and the severity of change of conditions in the said aqueous solution during its production and subsequent utilization. Generally from about 5 to about 250 parts per million inhibitor added to the geothermal fluid gives satisfactory inhibition of scale deposition, i.e., serves as a scale inhibiting amount of inhibitor.

The invention is further described by the following examples which are illustrative of specific modes of practicing the invention and are not intended as limiting the scope of the invention defined by the appended claims.

EXAMPLE 1

The effectiveness of a series of scale inhibitors is determined by adding 250 parts per million or less of various inhibitors to a series of 200 milliliter samples of water containing 200 milligrams per liter calcium ion added as calcium chloride and 200 milligrams per liter carbonate ion added as sodium carbonate. The test solution is 0.005 molar in calcium and in carbonate. The samples are placed in a 450 milliliter pressure reaction vessel consisting of an 8 ounce wide-mouth bottle with a polytetrafluoroethylene liner and a metal cap contained within a stainless steel pressure vessel. The void space in the pressure vessel outside the bottle is partially filled with 85 milliliters of water. The pressure vessel is sealed, heated to 400°F. in an oven and rotated at 16 revolutions per minute for 16 hours. After this time, the oven is turned off, the oven door opened and the sample allowed to rotate for an additional 1.5 hours while partially cooling. The pressure vessel is then removed from the oven, cooled to room temperature, opened and allowed to stand for one hour to allow any calcium carbonate scale formed to settle. The concentration of soluble calcium ion remaining in solution is determined by flame emission spectroscopy on a 5 milliliter portion of the supernatant liquid of the sample diluted with 200 milliliters of an aqueous solution containing 6 grams potassium chloride per gallon of distilled water. The results of the tests are shown in the following Table. The results are expressed in terms of "Calcium Ion Maintained in Solution (milligrams/liter)". The more effective inhibitors keep a higher concentration of the calcium ion in solution.

In the foregoing Example 1, run 1 shows the low amount of calcium ion maintained in solution in the absence of the inhibitor. Runs 2 through 8 show the effectiveness of various concentrations of one inhibitor of this invention. Runs 9 through 13 show that this inhibitor is effective when partially or completely neutralized with various alkaline materials. Runs 14 through 20 show the effectiveness of various concentrations of another inhibitor of this invention, and Runs 21 through 23 show the effectiveness of still other inhibitors of this invention or their salts.

EXAMPLE 2

When first placed on production, a geothermal well produces 200,000 pounds/hour wet steam containing 66 weight percent brine having dissolved therein 200 parts per million calcium ion. The surface temperature of the produced fluids is 400°F. After three months production, the volume of fluids which could be produced decreases drastically. The production tubing is pulled and portions of it are found to be almost completely plugged with calcium carbonate scale. New tubing is run into the well and a 1 inch diameter macaroni tubing string is run down the tubing casing annulus to a point just below the bottom end of the production tubing. Production is resumed at the same rate as when the well was first drilled. Simultaneously there is continuously metered down the macaroni string 1 barrel/day of N,N,N',N'-tetrakis methylene phosphonic acid ethylene diamine neutralized to pH 7.5 with ammonium hydroxide diluted with 20 barrels/day fresh water. After 6 months the well is still producing substantially the same quantity of steam indicating that scale build up in the production system is minimal.

Various embodiments and modifications of this invention have been described in the foregoing specification, and further modifications will be apparent to those skilled in the art. Such modifications are included within the scope of this invention as defined by the following claims:

EFFECTIVENESS OF INHIBITORS IN MAINTAINING
CALCIUM IONS IN SOLUTION AT 400° F. FOR 16 HOURS

| Run | Inhibitor (ppm) | | | Calcium Ion Maintained in Solution (milligrams/liter) |
|---|---|---|---|---|
| 1 | None | | | 10 |
| 2 | 250 | N,N,N',N'-tetrakis(methylene phosphonic acid)ethylene diamine | | 122 |
| 3 | 150 | do. | | 66 |
| 4 | 100 | do. | | 45 |
| 5 | 75 | do. | | 37 |
| 6 | 50 | do. | | 28 |
| 7 | 25 | do. | | 17 |
| 8 | 5 | do. | | 11 |
| 9 | 250 | do. neutralized with NaOH to pH 5.3 | | 111 |
| 10 | 250 | do. | do. 5.8 | 117 |
| 11 | 250 | do. | do. 7.0 | 109 |
| 12 | 250 | do. | do. ammonium hydroxide to pH 7.5 | 111 |
| 13 | 250 | do. | do. diethylene triamine to pH 7.8 | 136 |
| 14 | 250 | N,N,N',N'',N'''-pentakis(methylene phosphonic acid) diethylene triamine | | 82 |
| 15 | 150 | do. | | 63 |
| 16 | 100 | do. | | 55 |
| 17 | 75 | do. | | 48 |
| 18 | 50 | do. | | 29 |
| 19 | 25 | do. | | 14 |
| 20 | 5 | do. | | 8 |
| 21 | 250 | nitrilo tri(methylene phosphonic acid) | | 58 |
| 22 | 250 | do. - penta sodium salt | | 37 |
| 23 | 250 | N-benzyl-imino bis(methylene phosphonic acid) | | 66 |

Having now described our invention, we claim:

1. A method for inhibiting the formation of scale from geothermal fluids having a temperature above about 400°F., which comprises adding to the geothermal fluid a scale-inhibiting amount of a scale inhibitor comprising a substituted iminodi(methylene phosphonic acid) or a water-soluble salt thereof having the following formula

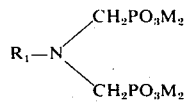

wherein $R_1$ is
i. —$CH_2PO_3M_2$ ii. 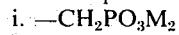

iii. 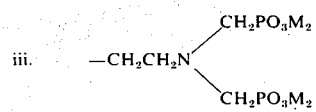

iv. 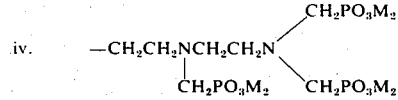

and M is hydrogen, an alkali metal or an ammonium cation.

2. The method defined in claim 1 wherein the concentration of said substituted iminodi(methylene phosphonic acid) or salt thereof is from about 5 to about 250 parts per million.

3. The method defined in claim 1 wherein said geothermal fluid is wet steam.

4. The method defined in claim 1 wherein said scale inhibitor is added to the geothermal fluid in a subterranean geothermal reservoir by injecting said scale inhibitor into said geothermal reservoir through a well penetrating said reservoir.

5. The method defined in claim 1 wherein said geothermal fluid is produced from a subterranean geothermal formation through a well penetrating said formation, and said scale inhibitor is added to the geothermal fluid in said well.

6. The method defined in claim 1 wherein said geothermal fluid is produced from a subterranean geothermal formation through a well penetrating said formation, and said scale inhibitor is added to said geothermal fluid at the surface prior to the subsequent utilization of said geothermal fluid.

7. In the method of producing geothermal fluids from a subterranean geothermal reservoir penetrated by a well in which the geothermal fluids containing scale-forming constituents are caused to flow up the well to the surface for subsequent recovery of heat from said geothermal fluids, the improvement which comprises adding to said geothermal fluids in said well at a subsurface location about 5 to about 250 parts per million of a scale inhibitor comprising a substituted iminodi(methylene phosphonic acid) or a water soluble salt thereof having the following formula:

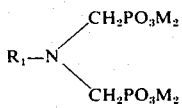

wherein $R_1$ is
i. —$CH_2PO_3M_2$ ii. 

iii. 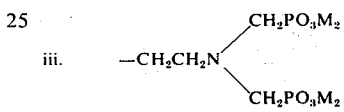

iv. 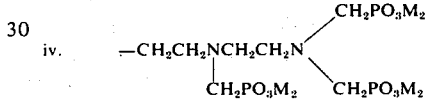

and M is hydrogen, an alkali metal or an ammonium cation.

8. In the method of producing geothermal fluids from a subterranean geothermal reservoir penetrated by a well in which the geothermal fluids containing scale-forming constituents are caused to flow up the well to the surface for subsequent recovery of heat from said geothermal fluids, the improvement which comprises adding to said geothermal fluids in said well at a subsurface location an aqueous solution of a scale inhibitor comprising a partially neutralized ammonium salt of N,N,N',N'-tetra(methylene phosphonic acid) ethylene diamine in an amount sufficient to provide a concentration of said scale inhibitor in said geothermal fluids of about 5 to 250 parts per million.

9. The method defined in claim 8 wherein said ammonium salt of N,N,N',N'-tetra(methylene phosphonic acid) ethylene diamine is neutralized to a pH of at least about 5.3

* * * * *